US009607035B2

(12) United States Patent
Allen et al.

(10) Patent No.: US 9,607,035 B2
(45) Date of Patent: Mar. 28, 2017

(54) EXTENSIBLE VALIDATION FRAMEWORK FOR QUESTION AND ANSWER SYSTEMS (71) Applicant: International Business Machines Corporation, Armonk, NY (US)

(72) Inventors: Corville O. Allen, Morrisville, NC (US); Ian M. Bennett, San Jose, CA (US); Torsten Bittner, San Jose, CA (US); Kay Mueller, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/284,184

(22) Filed: May 21, 2014

(65) Prior Publication Data
US 2015/0339574 A1   Nov. 26, 2015

(51) Int. Cl.
*G06F 17/30*   (2006.01)
*G06N 5/04*   (2006.01)
(52) U.S. Cl.
CPC .. *G06F 17/30371* (2013.01); *G06F 17/30654* (2013.01); *G06N 5/041* (2013.01)
(58) Field of Classification Search
None
See application file for complete search history.

(56) References Cited

U.S. PATENT DOCUMENTS

| 7,739,215 | B2 | 6/2010 | Horvitz et al. |
| 8,600,986 | B2 | 12/2013 | Fan et al. |
| 2006/0235689 | A1* | 10/2006 | Sugihara ............. G06F 17/2785 704/257 |
| 2008/0294637 | A1 | 11/2008 | Liu |
| 2009/0287678 | A1 | 11/2009 | Brown et al. |
| 2010/0151433 | A1 | 6/2010 | Powers et al. |
| 2011/0207109 | A1 | 8/2011 | Unsicker |

(Continued)

FOREIGN PATENT DOCUMENTS

| CA | 1230855 | 12/1987 |
| EP | 2565799 A1 | 3/2013 |
| EP | 2613234 A1 | 7/2013 |
| EP | 2616591 | 7/2013 |
| WO | WO01/93119 A1 | 12/2001 |
| WO | WO2010/028801 A2 | 3/2010 |

OTHER PUBLICATIONS

Akiba et al, Question Answering Using "Common Sense" and Utility Maximization Principle, 2004.*

(Continued)

*Primary Examiner* — Stanley K Hill
*Assistant Examiner* — Mikayla Chubb
(74) *Attorney, Agent, or Firm* — Stephen J. Walder, Jr.; Diana R. Gerhardt (57) ABSTRACT

Mechanisms are provided for validating a candidate answer to an input question. A candidate answer to an input question is identified using a natural language processing of the input question and a corpus of information from which the candidate answer is identified. A validator is selected to apply to the candidate answer based on a characteristic of a correct answer for the input question. The validator is applied to the candidate answer to evaluate whether or not criteria of the validator are met by the candidate answer. Validation information is generated based the evaluation of whether or not criteria of the validator are met by the candidate answer. The validation information is stored in a validation status object associated with the input question.

18 Claims, 5 Drawing Sheets

(56) References Cited

U.S. PATENT DOCUMENTS

| | | |
|---|---|---|
| 2012/0041950 A1 | 2/2012 | Koll et al. |
| 2012/0077178 A1 | 3/2012 | Bagchi et al. |
| 2012/0078837 A1 | 3/2012 | Bagchi et al. |
| 2012/0258435 A1 | 10/2012 | Tee et al. |
| 2012/0301864 A1 | 11/2012 | Bagchi et al. |
| 2013/0007055 A1 | 1/2013 | Brown et al. |
| 2013/0017524 A1 | 1/2013 | Barborak et al. |
| 2013/0018652 A1 | 1/2013 | Ferrucci et al. |
| 2013/0018876 A1 | 1/2013 | Chu-Carroll et al. |
| 2013/0035931 A1* | 2/2013 | Ferrucci ............ G06F 17/30976 704/9 |
| 2013/0066886 A1 | 3/2013 | Bagchi et al. |
| 2013/0132308 A1 | 5/2013 | Boss et al. |
| 2013/0226846 A1 | 8/2013 | Li et al. |
| 2013/0288219 A1 | 10/2013 | Dheap et al. |
| 2015/0324456 A1* | 11/2015 | Kim ................ G06F 17/30654 707/722 |
| 2016/0155058 A1* | 6/2016 | Oh ...................... G06N 99/005 706/11 |

OTHER PUBLICATIONS

Grappy et al, Answer type validation in question answering systems, 2010.*

Harabagiu et al, Methods for Using Textual Entailment in Open-Domain Question Answering, 2006.*

Magnini et al, Is It the Right Answer? Exploiting Web Redudancy for Answer Validation, 2002.*

Pakray et al, A Hybrid Question Answering System based on Information Retrieval and Answer Validation, 2011.*

List of IBM Patents or Patent Applications Treated as Related (Appendix P), 1 page.

Baughman, Aaron K. et al., "DeepQA Jeopardy! Gamification: A Machine Learning Perspective", IEEE Transactions on Computational Intelligence and AI in Games journal, TCIAIG-2013-0004.RI, 2013, pp. 1-12.

Gondek, D.C. et al., "A framework for merging and ranking of answers in DeepQA", IBM J. Res. & Dev., vol. 56, No. 3/4, Paper 14, May/Jul. 2012, pp. 14:1-14:12.

High, Rob, "The Era of Cognitive Systems: An Inside Look at IBM Watson and How it Works", IBM Corporation, Redbooks, Dec. 12, 2012, 16 pages.

Kalyanpur, A et al., "Fact-based question decomposition in DeepQA", IBM J. Res. & Dev., vol. 56, No. 3/4, Paper 13, May/Jul. 2012, pp. 13:1-13:11.

Ligozat, Anne-Laure et al., "Towards an automatic validation of answers in Question Answering", 19th IEEE International Conference on Tools with Artificial Intelligence, 2007, pp. 444-447.

Yuan, Michael J., "Watson and healthcare, How natural language processing and semantic search could revolutionize clinical decision support", IBM developerWorks, IBM Corporation, Apr. 12, 2011, 14 pages.

* cited by examiner

EXTENSIBLE VALIDATION FRAMEWORK FOR QUESTION AND ANSWER SYSTEMS

BACKGROUND

The present application relates generally to an improved data processing apparatus and method and more specifically to mechanisms for providing an extensible validation framework for improved accuracy and performance in a question and answer system.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the IBM Watson™ system available from International Business Machines (IBM) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

Various United States Patent Application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system comprising a processor and a memory, for validating a candidate answer to an input question. The method comprises generating, by the data processing system, a candidate answer to an input question using a natural language processing of the input question and a corpus of information from which the candidate answer is identified. The method further comprises selecting, by the data processing system, a validator to apply to the candidate answer based on a characteristic of a correct answer for the input question. In addition, the method comprises applying, by the data processing system, the validator to the candidate answer to evaluate whether or not criteria of the validator are met by the candidate answer. Moreover, the method comprises generating, by the data processing system, validation information based the evaluation of whether or not criteria of the validator are met by the candidate answer. Additionally, the method comprises storing, by the data processing system, the validation information in a validation status object associated with the input question.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

A question and answer system (QA system) is an artificial intelligence application executing on data processing hardware that answers questions pertaining to a given subject-matter domain presented in natural language. The QA system may receive inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA system. The document may include any file, text, article, or source of data for use in the QA system. For example, a QA system accesses a body of knowledge about the domain, where the body of knowledge (knowledgebase) can be organized in a variety of configurations, e.g., a structured repository of domain-specific information, such as ontologies, or unstructured data related to the domain, or a collection of natural language documents about the domain.

Content users input questions to the QA system which then answers the input questions using the content in the corpus of data by evaluating documents, sections of documents, portions of data in the corpus, or the like. When a process evaluates a given section of a document for semantic content, the process can use a variety of conventions to query such document from the QA system, e.g., sending the query to the QA system as a well-formed question which are then interpreted by the QA system and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA system receives an input question, parses the question to extract the major features of the question, uses the extracted features to formulate queries, and then applies those queries to the corpus of data. Based on the application of the queries to the corpus of data, the QA system generates a set of hypotheses or candidate answers to the input question, by looking across the corpus of data for portions of the corpus of data that have some potential for containing a valuable response to the input question. The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

It should be appreciated that when configuring a QA system to answer input questions, it is important to train the QA system using machine learning techniques to iteratively modify the operation of the QA system until a desired performance is achieved, e.g., a determined level of accuracy. A method of determining the accuracy of a QA system includes, during training of the QA system, verifying an answer provided by the QA system using a set of acceptable answers. The set of acceptable answers is called an answer key. If the QA system's answer for a question matches an answer for that question in the answer key, the QA system is deemed to have responded correctly, otherwise if there is no match, then the QA system is deemed to have responded incorrectly. The proportionality of the correct versus the incorrect answers for a plurality of questions in a given domain corresponds to the accuracy of the QA system in that domain.

The answers in an answer key used to verify the accuracy of a QA system typically include only a limited set of answers for each question expected to be asked of the Q and A system. An answer used in an answer key has an associated answer type. Presently, answer keys use a collection of answer types that are expected to represent limited forms of acceptable answers for all potential questions in a given domain or sub-domain. Generally, the presently used answer types are divided into two categories—literal and regular expressions.

A literal answer type specifies an exact and complete answer, which must match precisely with the answer from the QA system. For example, if an answer of the literal answer type in a given answer key is "cheese", a QA system answer of "Cheese" (capitalized) or "Swiss cheese" (specific) will not match the literal answer in the answer key.

A regular expression is a compact notation for describing character or string variations within a given text. A regular expression answer type allows for an answer to be varied according to the validity of a sequence of characters used in the answer. For example, if the correct answer to a question can be "Peter Parker" or "Spiderman", an answer of the regular expression type in a given answer key can be "Peter.*Parker|Parker.*Peter|Spider-man|Spiderman|Spider.*man". The regular expression wildcard character "*", for example, allows for any other character, such as a blank space, to replace the "*". This manner of expressing answer variations using regular expressions allows limited variations of stylistic forms in which a QA system can answer a question in an acceptable manner.

While the use of answer types in the answer key provides some measure of correctness of the answers generated by the QA system, the literal answer type and the regular expression answer type are overly restrictive in describing acceptable answers in an answer key and an acceptable answer can take many other forms, which do not fit within the scope of the literal answer type and the regular expression answer type. As a result, mechanisms have been proposed for extending or expanding the answer key to include other forms of answer type, referred to herein as an extension type, which provide a greater capability for evaluating the correctness of answers generated by the QA system. An example mechanism for extending or expanding an answer key to include such an extension type is described in commonly assigned and co-pending U.S. patent application Ser. No. 14/109,626, entitled "Expanding an Answer Key to Verify a Question and Answer System," which is hereby incorporated by reference. The mechanisms of U.S. patent application Ser. No. 14/109,626 define an expanded answer type, which can be used to expand the set of acceptable answers in an answer key used for verifying QA system answers in a domain and refine the expanded answer type into new answer types as needed for accommodating answer variations for specific questions. Such expanded answer types, or "extension types," can be domain specific, question specific, language specific, region specific, skill-level specific, or specific according to other considerations in answering a question in a domain. For example, without implying a limitation thereto, answer variations that may be specified by extension types can include value ranges, different languages, precision according to the skill of the question-asker, temporal context of an answer such as validity periods of an answer (an answer may be valid now but not valid next month), synonyms, and the like.

For example, an example ontology may include information on "what breathes under water." A QA system may answer, "salmon." However, the answer key may have "fish" as the valid answer. One embodiment to cover answer variations can specify, for example by including metadata to "accept ontology," would make "salmon" also a correct answer variation.

While the extended answer key mechanisms provide additional ability to determine the correctness of the answers generated by a QA system relative to the answer key by providing additional flexibility of the matching of the generated answers to answers in the answer key, the validation itself is still limited to indicating a Boolean result of whether the answer generated is correct or incorrect. That is, presently, validation mechanisms do not provide any information regarding the way in which an answer was generated by the QA system; only whether the QA system generated a correct answer or not. Thus, in some situations, a QA system may generate a correct answer, but may not have generated the correct answer for the correct reason and thus, the incorrect operation of the QA system may be masked. Thus, it would be beneficial to be able to not only validate the answers generated by the QA system, but also the manner by which the answers are generated.

The illustrative embodiments provide mechanisms for providing an extensible validation framework for improved accuracy and performance in a question and answer system. As noted above, when evaluating the correctness of the operation of a Question and Answer (QA) system, such as the IBM Watson™ QA system available from International Business Machines Corporation of Armonk, N.Y., validation systems are inflexible and typically only allow for a Boolean value result based on the answer generated by the QA system, e.g., the answer generated by the QA system is correct or incorrect. Such validation systems also do not provide access to supporting evidence or contextual information associated with the answer that was generated by the QA system. However, in various domains, it is important to not only ensure that the correct answer is generated with a particular required level of confidence, but also to ensure that the correct answer exists for the correct reason or that the answer was obtained with the correct level of performance. This requires the ability to track and analyze information about the way in which a candidate answer is generated within the QA system, an ability to evaluate the supporting evidence of the candidate answer, an ability to evaluate the performance of the QA system while the QA system performs operations for generating the candidate answer, and the like, in order to determine whether the candidate answer was generated for the correct reasons, with the correct level of performance, etc.

The extensible validation framework of the illustrative embodiments validates the operation of a QA system using pluggable validators, candidate answer wrappers, and validation status tracking objects to gather information about the correctness of the candidate answer and the reasons behind why the candidate answer was selected as a correct answer for an input question. With the mechanisms of the illustrative embodiments, a registry is provided through which the pluggable validators may be registered for use with the validation framework. The validators are algorithms that may execute to validate one or more criteria associated with an answer type or extension type. Through registration via the registry, the validators are linked with their corresponding answer type or extension type, e.g., a "RangeValidator" may be registered and linked with a "RangeExtension" extension type with the RangeValidator comprising logic that checks that the candidate answer is a number between a min and max value, inclusively. The values for min and max may be passed in as arguments to the RangeValidator from the answer or extension type in the answer key as described hereafter. Thus, the validator registry may comprise the registration information, e.g., identifier, location, etc., of a plurality of validators with each validator being linked to at least one answer key type, i.e. an answer type or extension type.

During validation, a status object is used to collect the information regarding each of the stages of validation by the invocation of the registered validators for the particular answer type(s) and/or extension type(s). This status object is passed along all of the stages of validation of a candidate answer and collects the validation status which can reflect any validation information deemed suitable for the particular implementation. That is, when performing validation, the candidate answer is passed to a top level validator which can fan-out validation of various answer type and extension type validators in a serial or parallel fashion. Based on the particular answer type(s) and extension type(s) for the correct answer for the question, as specified in the answer key, corresponding validators are selected for validating the candidate answer using the validator registry. Parameters for use by the validators may be passed into the validators from the answer key, e.g., range min/max values, or the like. The validators execute their logic on the candidate answer and generate validation information which may then be written back to the status object by the validators. This validation information may comprise a log of the operations performed by the validators and the corresponding result, or simply the result generated by the particular validator. The validation information provides an insight into how and why the candidate answer was correct or incorrect from the viewpoint of each validator.

The validators may operate not only on the candidate answer itself, but also other contextual information about the candidate answer that may be generated by the QA system, e.g., the underlying evidence supporting the candidate answer as a correct answer for the input question, performance information, or the like. This is achieved by utilizing a representation of candidate answer in an abstract candidate answer model that comprises the candidate answer (or "response") which is wrapped with candidate answer contextual information indicating the candidate answer type, the rank of the candidate answer, a confidence value associated with the candidate answer, and the supporting evidence passages, or pointers to the supporting evidence passages, that support the candidate answer being selected by the QA system as a correct answer for the input question. This wrapped contextual information for the candidate answer allows for the creation of validators that, for example, may be used to ensure that there are requisite pieces of information in supporting evidence passages, for example, in order to consider the candidate answer as being correct.

Moreover, using the abstract candidate answer model, the candidate answer itself may not be limited to just textual answers but may also support other answer types including text, Extensible Markup Language (XML), JavaScript Object Notation (JSON), binary, audio, and video answers. The contextual information in the wrapper of the candidate answer provides the context property information (e.g., rank, supporting evidence, confidence, answer type) that may be evaluated using the validators. Furthermore, the validators may be used to validate different performance characteristics of the QA system, e.g., was the candidate answer generated within a particular pre-determined time period.

As mentioned above, the log of the validator operation and/or the results of the validator analysis are stored in a status object that is passed from validator to validator during the validation operations and updated by the validators. In other illustrative embodiments, the status object may be updated in parallel based on parallel operation of the validators. The information stored in the status object may be subjected to introspection to examine and analyze the validation information stored therein and determine whether the candidate answer was generated by the QA system correctly. Hence, a more accurate result of the validation is made possible by not only indicating whether or not the candidate answer is a correct answer for the input question in accordance with a matching with the answer key, but also may provide a more detailed analysis and result indicating whether the candidate answer met certain requirements of validation based on the answer type(s) and/or extension types(s) which indicates whether or not the candidate answer was determined to be correct for the correct reasons.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
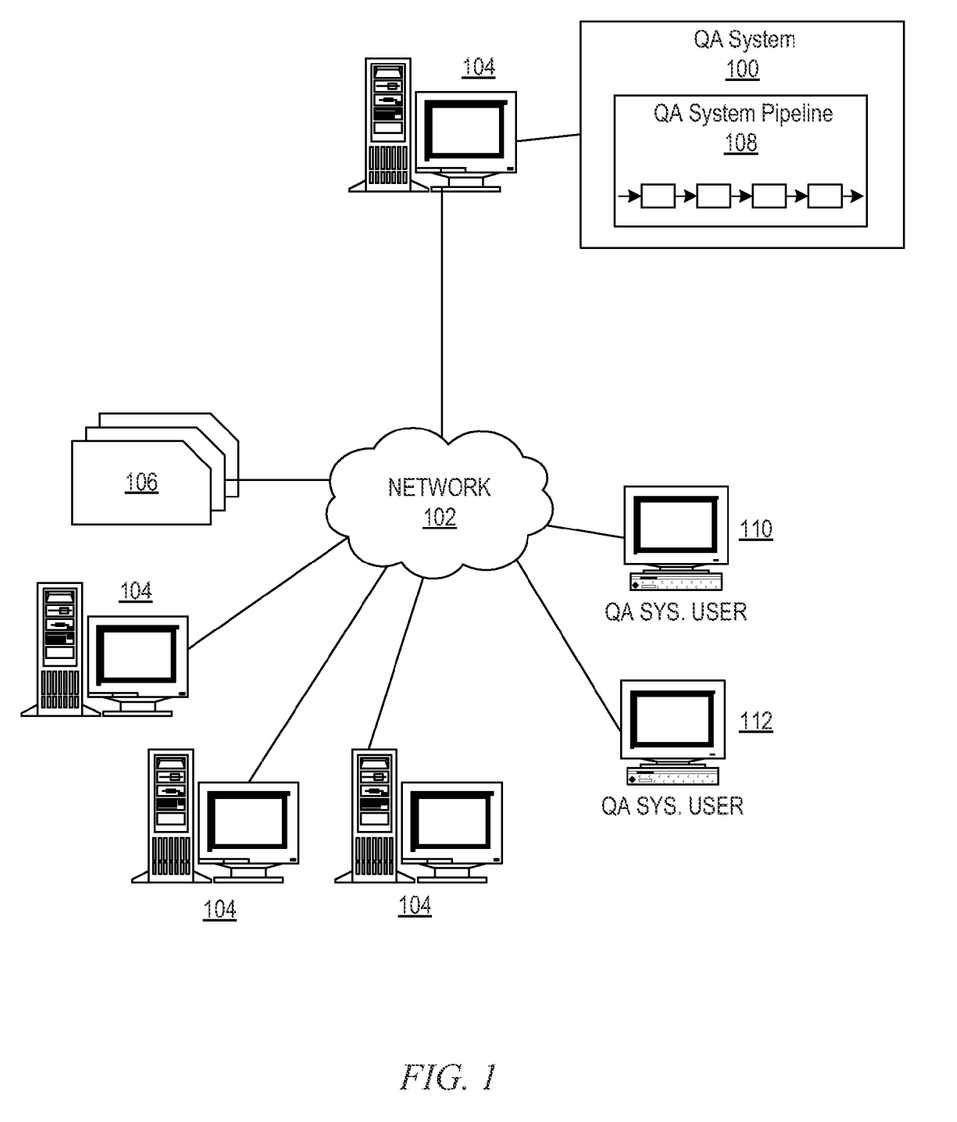
FIG. 1 depicts a schematic diagram of one illustrative embodiment of a question/answer creation (QA) system in a computer network.
Figure 2:
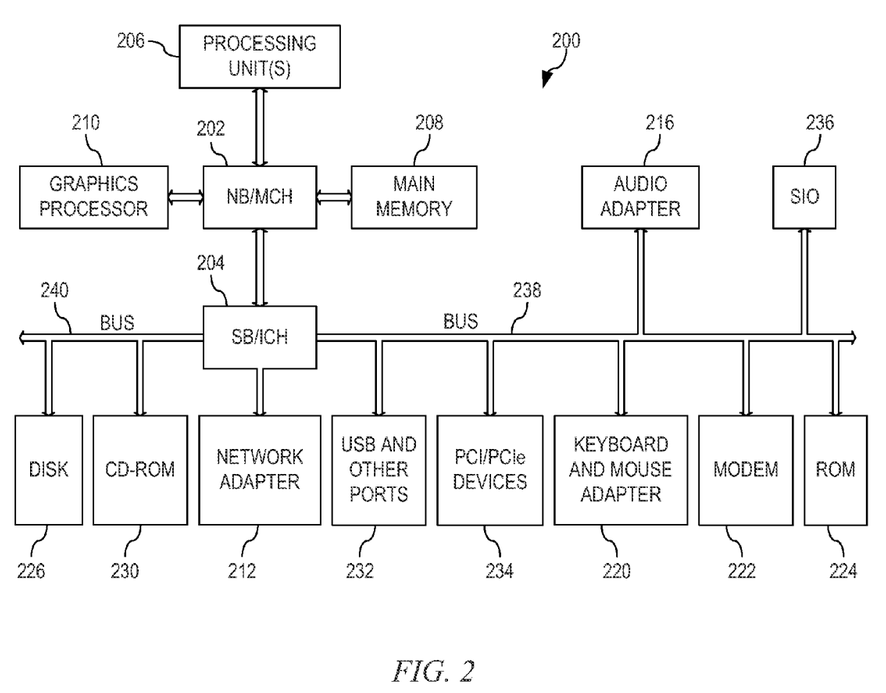
FIG. 2 is a block diagram of an example data processing system in which aspects of the illustrative embodiments may be implemented.
Figure 3:
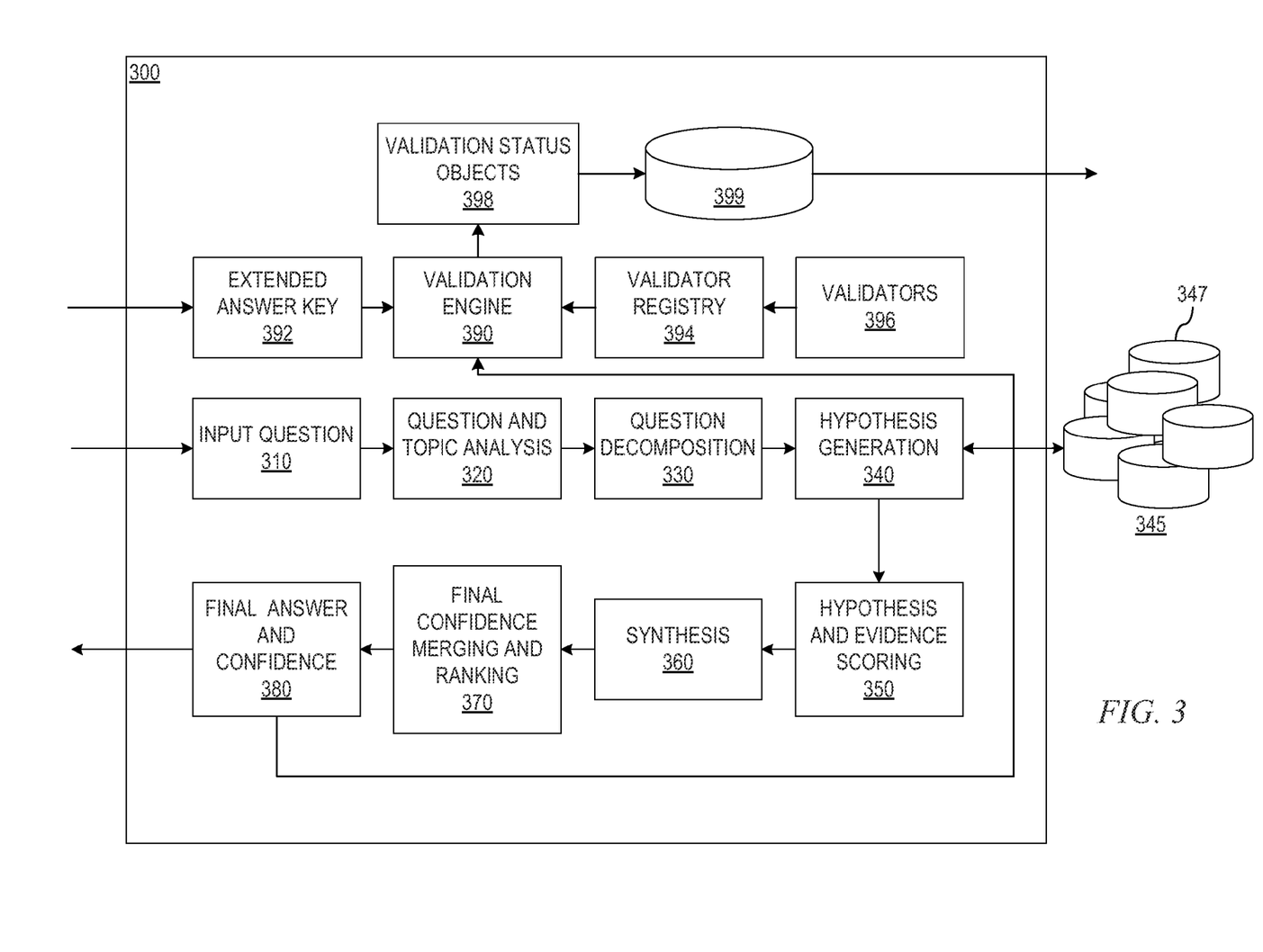
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to validating candidate answers generated by the QA mechanisms.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

Since the mechanisms of the illustrative embodiments operate in conjunction with a QA system, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, may determine use cases for products, solutions, and services described in such content before writing their content. Consequently, the content creators may know what questions the content is intended to answer in a particular topic addressed by the content. Categorizing the questions, such as in terms of roles, type of information, tasks, or the like, associated with the question, in each document of a corpus of data may allow the QA system to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, may annotate or otherwise generate metadata for providing information useable by the QA system to identify these question and answer attributes of the content.

Operating on such content, the QA system generates answers for input questions using a plurality of intensive analysis mechanisms which evaluate the content to identify the most probable answers, i.e. candidate answers, for the input question. The illustrative embodiments leverage the work already done by the QA system to reduce the computation time and resource cost for subsequent processing of questions that are similar to questions already processed by the QA system.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. The QA system 100 and network 102 may enable question/answer (QA) generation functionality for one or more QA system users via their respective computing devices 110-112. Other embodiments of the QA system 100 may be used with components, systems, sub-systems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 may be routed through the network 102. The various computing devices 104 on the network 102 may include access points for content creators and QA system users. Some of the computing devices 104 may include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 may include local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document may include any file, text, article, or source of data for use in the QA system 100. QA system users may access the QA system 100 via a network connection or an Internet connection to the network 102, and may input questions to the QA system 100 that may be answered by the content in the corpus of data 106. In one embodiment, the questions may be formed using natural language. The QA system 100 may interpret the question and provide a response to the QA system user, e.g., QA system user 110, containing one or more answers to the question. In some embodiments, the QA system 100 may provide a response to users in a ranked list of candidate answers.

The QA system 100 implements a QA system pipeline 108 which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the IBM Watson™ QA system available from International Business Machines Corporation of Armonk, N.Y., which is augmented with the mechanisms of the illustrative embodiments described hereafter. The IBM Watson™ QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features may then be used during the question decomposition stage 330 to decompose the question into one or more queries that may be applied to the corpora of data/information 345 in order to generate one or more hypotheses. The queries may be generated in any known or later developed query language, such as the Structure Query Language (SQL), or the like. The queries may be applied to one or more databases storing information about the electronic texts, documents, articles, websites, and the like, that make up the corpora of data/information 345. That is, these various sources themselves, different collections of sources, and the like, may represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries may be applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus may then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis.

In the synthesis stage 360, the large number of relevance scores generated by the various reasoning algorithms may be synthesized into confidence scores for the various hypotheses. This process may involve applying weights to the various scores, where the weights have been determined through training of the statistical model employed by the QA system and/or dynamically updated, as described hereafter. The weighted scores may be processed in accordance with a statistical model generated through training of the QA system that identifies a manner by which these scores may be combined to generate a confidence score or measure for the individual hypotheses or candidate answers. This confidence score or measure summarizes the level of confidence that the QA system has about the evidence that the candidate answer is inferred by the input question, i.e. that the candidate answer is the correct answer for the input question.

The resulting confidence scores or measures are processed by a final confidence merging and ranking stage 370 which may compare the confidence scores and measures, compare them against predetermined thresholds, or perform any other analysis on the confidence scores to determine which hypotheses/candidate answers are the most likely to be the answer to the input question. The hypotheses/candidate answers may be ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, may be generated and output to the submitter of the original input question.

As shown in FIG. 3, in accordance the illustrative embodiments, a validation engine 390 is utilized to validate the answers generated by the QA system pipeline 300 to ensure proper operation of the QA system. Results of the validation performed by the validation engine 390 may be logged in a validation log data structure 399 or otherwise output to an authorized user for evaluation and determination as to modifications to be made to the operation of the QA system pipeline 300 to ensure proper operation of the QA system pipeline 300. The validation results may be used to train the QA system pipeline 300 based on whether or not the QA system pipeline 300 is generating correct answers for the correct reasons or not. In addition, certain additional operations that may be performed based on the validation results include the increasing of the size of the corpora, modifying search query generation logic, adding features to be utilized during the machine learning or training of the QA system pipeline 300, and the like.

The validation engine 390 may utilize an expanded answer key 392 that identifies the correct answers for input questions and maps the answer type(s) and extension type(s) for the correct answer. The expanded answer key 392 may be of the type described in commonly assigned and co-pending U.S. patent application Ser. No. 14/109,626 for example. The answer key 392 is a machine-readable answer key document or data structure that includes an answer key object. In one embodiment, the answer key 392 is an Extensible Markup Language (XML) document and the answer key object complies with a given XML specification. The answer key object includes a set of question type objects where each question type object represents a question from a domain or sub-domain to which the answer key 392 pertains. Different question type objects are defined to represent different types of questions that can be asked in the domain.

The question in an instance of a question type object is deemed to have been answered correctly if the answer matches an answer in an answer type object associated with question type object, according to a rule applicable to an answer option in the answer type object. The answer type object is formed using a literal answer type definition or regular expression answer type definition, for example, and represents a correct or acceptable literal answer to the question in the question type object or a regular expression form of a correct or acceptable answer to the question in the question type object.

In addition, the question type object comprises one or more extended answer type objects, each defined using a corresponding concrete extension type definition. Generally, any number of extended answer type objects, corresponding to one or more concrete extension type definitions, may be associated with the question type object in an answer key 392. The concrete extension type object is created from an abstract extension type definition. The abstract extension type definition can be manipulated to result in a corresponding concrete extension type definition.

The abstract extension type definition acts as a placeholder in answer key for extending the acceptable answers to a question represented in answer key. Thus, the abstract extension type definition may be used to generate a concrete extension type definition based on the particular question and question features. Only as an example and without implying a limitation thereto, the embodiment may define the concrete extension type definition to represent a range of answers. For example, a literal answer to a question may be the number 65. In reality, any answer within the range of 64-66, inclusive of 64 and 66, might be an acceptable answer to the question. Existing literal and regular expression answer types are inadequate to capture such variations in acceptable answers. Concrete extension type definition allows specifying a range of valid answers to a question in answer key. Similarly, the concrete extension type definition, in other examples, may represent one or more languages of acceptable answers, answer variations in a specific language, variations in terms of temporal characteristics or dependency, variations of answers in terms of synonyms to the answer given, or the like.

The answer key 392 comprising the question type, answer type(s), and extension type(s) may be used by the validation engine 390 to determine the validators to use to validate the candidate answer based on a validator registry 394. Thus, for the particular answer type(s) and extension type(s) of the answer type object for the question type of the input question, a lookup of the validators corresponding to these answer type(s) and extension type(s) is performed in the validator registry 394. The validators 396 identified by the lookup in the validator registry 394 may then be applied to the candidate answer, the evidence passages, and/or performance data generated and logged during the answer generation by the QA system pipeline 300 to thereby generate validation information that is logged in the validation status object 398 for the candidate answer. Multiple validators may be applied to the candidate answer, the evidence passages, and/or performance data based on the answer type(s) and extension type(s) associated with extended answer key's answer object for the input question. There may be multiple validation status objects 398 for a plurality of candidate answers with the resulting validation status objects 398 being stored in a validation data structure 399 in association with the input question or an identifier of the input question.

The resulting validation status objects 398 may be used for introspection to determine the result of the validation process and provide insight into the reasons why the candidate answer was selected as a correct answer for the input question. The validation information in the validation status objects 398 may be output to a system administrator or the like so that the system administrator may evaluate whether the QA system pipeline is operating correctly and where the possible errors, if any, are present in the operation of the QA system pipeline. As a result, the system administrator may initiate corrective actions to adjust the QA system pipeline operation to generate more accurate results. For example, the system administrator may modify operational parameters of one or more of the stages of the QA system pipeline so as to modify their operation, may modify the required level of confidence for an evidence passage to be determined as supporting of the candidate answer, modify the corpus of documents used as a basis for performing the QA system pipeline, or the like.

Figure 4:
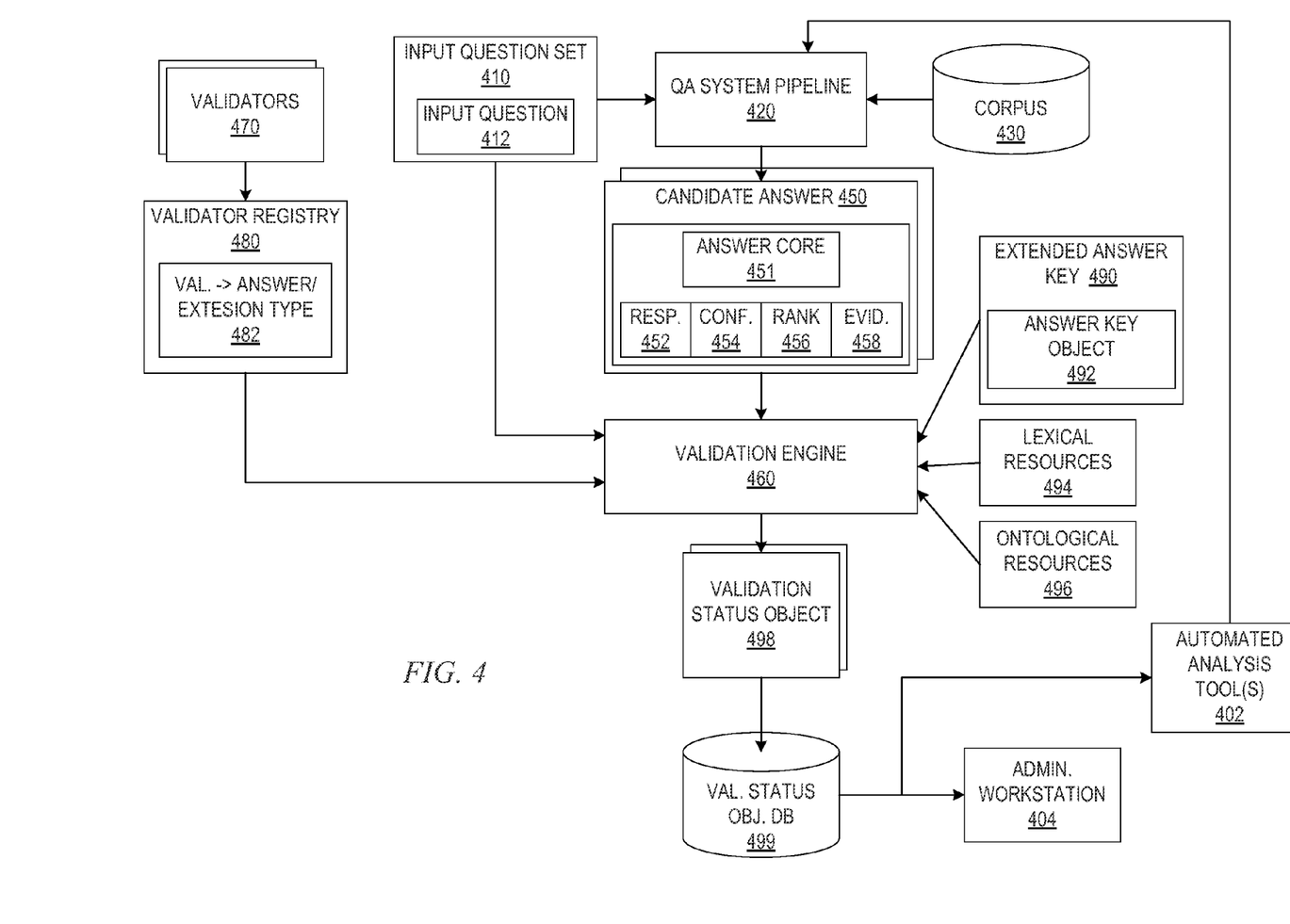
FIG. 4 is an example block diagram illustrating an operation of the illustrative embodiments with regard to registering and utilizing validators in accordance with one illustrative embodiment.

FIG. 4 is an example block diagram illustrating an operation of the illustrative embodiments with regard to registering and utilizing validators in accordance with one illustrative embodiment. As shown in FIG. 4, with the mechanisms of the illustrative embodiments, one or more validators 470 are registered in a validation registry 480 in association with one or more predetermined answer type(s) and/or extension type(s). The validators 470 are logic elements, implemented as software instructions executing on one or more hardware devices, specialized hardware logic, or the like, that perform operations on candidate answers 450 and their context information to validate that the candidate answer 450 is correct for the input question and to generate information indicating the reasoning behind why the candidate answer 450 is either correct/incorrect for the input question independent of the result of the evaluations performed by the QA system pipeline 420 That is, the validators are "independent" in that the QA system pipeline 420, when it generates a candidate answer, does not know whether the candidate answer is indeed correct or not, but views the candidate answer as correct according to its training. The validators operate to inform the QA system pipeline 420 whether the candidate answer is indeed correct or not and whether the candidate answer was generated for the correct reasons. Thus, using an independent validation of the results generated by the QA system pipeline 420, the validators 470 are able to validate proper operation of the QA system pipeline 420.

The validators 470 may be configured to perform operations for validating any candidate answer and/or candidate answer context information, e.g., the response itself 452, the confidence metric 454, the ranking metric 456, and/or the supporting evidence passage(s) 458, against any suitable criteria for the particular implementation. For example, a first validator 470 may be a RangeValidator which validates that a candidate answer is within a given range of values, dates, or any other numerical representation. A second validator 470, e.g., a SynonymValidator, may be provided that validates whether a candidate answer is a synonym of the literal answer for the input question. A third validator 470, e.g., a PerformanceValidator, may be provided that validates whether the time, number of processor cycles, or other performance characteristic of the QA system when generating the candidate answer was within a given tolerance or threshold value. A fourth validator 470, e.g., an OntolotyValidator, may be provided to validate whether the candidate answer is associated with the literal answer in a given ontology. Of course other types of validators may be used in conjunction with, or in replacement of, these example validators without departing from the spirit and scope of the illustrative embodiments. For example, supporting passage validators that validate whether the supporting passage provides support for the candidate answer being the correct answer for the input question, or the like, may be utilized.

In registering the validators 470 in the validator registry 480, the validators 470 are registered as being associated with a particular answer type and/or extension type. A validator 470 may be associated with more than one answer type and/or extension type, but for purposes of the present description, it will be assumed that a validator 470 is associated with a single answer type or extension type. Thus, for example, a validator 470 that checks to see if the candidate answer matches exactly the literal answer for the input question, as specified in the answer key 490, may be registered as a LiteralValidator and may be associated with an answer type of "Literal". Similarly, a validator 470 that check to see if the candidate answer is a form of a real expression corresponding to the literal answer may be registered as a ReexpValidator in association with an answer type of "Real Expression." Still further, a RangeValidator may be registered in the validator registry 480 as being associated with an extension type of "Range." As another example, a SynonymValidator may be registered in the validator registry 480 as being associated with an extension type of "Synonym." Thus, the validator registry 480 provides a mapping of answer type/extension type to validator 470.

The answer types and extension types are pre-defined in the particular implementation such that they are known to be useable in the extended answer key 490 and in the validator registry 480. In this way, answer types/extension types specified in the extended answer key 490 may be used as a basis for performing a lookup operation of the corresponding answer type/extension type in the validator registry 480 and a corresponding validator 470 may be identified. Thus, for example, a pre-defined set of answer types and extension types may be determined to exist and may be used as a basis for defining correct answers for input questions 410 in the extended answer key 490.

The extended answer key 490 may store a plurality of answer key objects 492 with each answer key object 492 being linked to a corresponding input question 412 from an input question set 410. The answer key object 492 stores one or more answer type(s) and/or extension type(s) for the answer. For example, the answer type(s) may include a literal answer type that specifies the literal answer for the input question and/or a real answer type that specifies the various real expressions that may represent correct answers matching the literal answer. The extended answer type(s) may include, for example, a range extension type that specifies a range extension and has parameters of "(2, 5), inclusive" indicating that the correct answer is within the range from a minimum value of 2 to a maximum value of 5 and that the range is inclusive of the end points. As another example, the extended answer type(s) may include, for example, a synonyms extended answer type that specifies that synonyms to the literal answer type are permitted to be correct answers for the input question. As still a further example, the extended answer type(s) may include, for example, an ontology extended answer type that specifies that associated terms to that of the literal answer may be permitted to be correct answers for the input question. Thus, the answer key 490 comprises answer key objects 492 that represent a mapping of the correct answer for an input question to one or more answer types and/or extension types.

During operation, either during training of the QA system pipeline 420 or during runtime operation of the QA system pipeline 420, an input question 412, such as from the input question set 410 (which may be a training set), is input to the QA system pipeline 420 for processing. During a training operation, for example, the input question set 410 may be a training input question set created by a subject matter expert (SME), i.e. a human being that is an expert in a particular domain of subject matter. Similarly, the SME may define the answer key objects 492 in the extended answer key 490 for the input questions 412 of the input question set 410.

The input question 412 is processed by the QA system pipeline 420 using the information in the corpus 430 in a manner similar to that described above with regard to FIGS. 1-3, for example. The result is the generation of one or more candidate answers 450 for the input question 412. Preferably, although not required, the candidate answers 450 may be provided as a ranked listing of candidate answers as previously described above.

The candidate answers 450 are generated using a generic candidate answer model that facilitates the generation of candidate answers 450 having differing formats for various types of validation tools. For example, the generic candidate answer model may be used to generate a Common Analysis Structure (CAS) object or other data representation of the candidate answer. The candidate answers 450 have a confidence measure metric 454 calculated by the QA system pipeline 420, the rank of the candidate answer 450 as calculated by the QA system pipeline 420, and the supporting evidence passages 458 that provide support for the candidate answer 450 being a correct answer for the input question 412. For example, a candidate answer "George Washington" may have rank of 1, meaning it is a top answer, with a 95 percent confidence, and with 8 supporting documents from 3 books, 2 Wikipedia website entries, and 3 newspaper articles.

The candidate answers 450 are input to the validation engine 460 for validation. The validation engine 460 further receives as input, the validator registry 480, the extended answer key 490, and other resources for providing data input used during the validation engine 460 operation, such as the lexical resources 494, e.g., thesaurus resource, dictionary resource, etc., and ontological resources 496 that specify an ontology for a domain. The validation engine 460, based on the identification of the input question 412 performs a lookup operation in the extended answer key 490 to identify an answer key object 492 corresponding to the input question 412. Having identified an answer key object 492 for the input question 412, the answer key object 492 specifies the answer type(s) and extension type(s) and their parameters for the correct answer for the input question 412. The validation engine 460 then utilizes the answer type(s) and extension type(s) specified in the answer key object 492 to perform a lookup operation in the validation registry 480 to select one or more validators corresponding to the answer type(s) and extension type(s).

The selected validator(s) 470 in the validator registry 480 are then passed the corresponding parameters from the answer key object 492, e.g., the range parameters in the answer key object 492 are passed as input to a RangeValidator that checks whether a candidate answer value is "within (min, max) either inclusively or exclusively" such that the values for "min" and "max" may be populated in the RangeValidator and options, such as "inclusive or exclusive" may be set. The selected validator(s) 470 that are configured using the passed in parameters are then applied to the corresponding candidate answer 450. This may involve the validator(s) 470 processing the core answer 451, the response 452, the confidence 454, the rank 456, and/or the support evidence passages 458, or any combination of this information. Although not shown in FIG. 4, the wrapper of the answer 450 may further comprise performance metrics generated by the QA system pipeline 420 during execution of its operations when generating the candidate answer and the validator(s) 470 may further comprise performance validation validators as well, e.g., validating that the amount of time/number of processing cycles required to generate the candidate answer is within a given tolerance, range, or the like.

The logic of the selected validator(s) 470 is applied to the candidate answer 450 to determine if the criteria of the selected validator(s) 470 are satisfied or not. This provides an indication of the reasons why the candidate answer 450 is either correct/incorrect, with the reasons being specified by the criteria of the validator(s) 470, e.g., if the validator 470 is a SynonymValidator, and the candidate answer 450 is a synonym of the correct literal answer, the SynonymValidator will return a result that the candidate answer 450 is a synonym of the correct literal answer and this is a reason why the candidate answer 450 was selected as a correct answer for the input question. Whether or not the candidate answer 450 is a synonym or not may be determined using the lexical resources 494. Similarly, a determination whether the candidate answer 450 is associated with the correct literal answer in an ontology may be made using the ontological resources 496. Ranges may be checked based on the range parameters input from the answer key object 492.

The result of the validation engine 460 application of the selected validator(s) 470 is validation information that is stored in a validation status object 498 for the input question 412. The validation status object 498 may be passed from stage to stage during the validation engine 460 and may be dynamically updated as the validation operations proceed using write-back operations invoked by the validator(s) 470. Alternatively, the validation status object 498 may be stored in a central location, such as in the validation status objects database 499, and dynamically updated as the validator(s) 470 complete their operations.

The resulting validation status objects 498 may be stored in the validation status objects database 499 for later use. For example, various automated analysis mechanisms 402 may be applied to the validation status objects 498 to analyze the operation of the QA system pipeline 420 to determine proper or improper operation of the QA system pipeline 420 and generate recommendations for modifying the operation of the QA system pipeline 420 to achieve more accurate performance. For example, an automated analysis mechanism can check the performance of the primary search to be within 300 milliseconds and the overall system to return an answer within 1 second by finding these values in the status object. The recommendations may be output to an administrator workstation 404 for evaluation by a human administrator to thereby inform the human administrator of possible areas where the operation of the QA system pipeline 420 may be improved to achieve a more accurate performance. Alternatively, the recommendations may be automatically implemented by modifying one or more performance parameters of the QA system pipeline 420 to achieve more accurate performance, e.g., reducing the number of candidate answers to be evaluated.

Alternatively, the validation status objects 498 in the validation status objects database 499 may be used to generate an output to the administrator workstation 404 to inform the system administrator or other authorized personnel of the results of the validation operation so as to inform the system administrator of the valid/invalid operation of the QA system pipeline. In particular, the validation status objects 498 specify the reasons behind why the candidate answer 450 was selected as a correct answer for the input question 412 and specifies whether the candidate answer was correctly selected as a candidate answer 450.

Thus, the mechanisms of the illustrative embodiments provide mechanisms for validating the candidate answers generated by the QA system using a pluggable validation framework. The validation performed by the illustrative embodiments provides improved validation information above and beyond the Boolean output of whether the candidate answer is correct or not by providing additional extended validation logic for evaluating and identifying the validation criteria for why the candidate answer was selected as a correct candidate answer. Thus, while training the QA system, a plurality of extensions of correctness can be performed. That is, the illustrative embodiments do not just inform the QA system that it generated a correct answer in the simple literal form or a Boolean true or false. The illustrative embodiments provide information regarding the overall precision, accuracy, and performance of the QA system that can be evaluated and trained in a pluggable manner using validators within the validator framework. With the mechanisms of the illustrative embodiments, flexible validators are provided for determining the correctness of an answer and training the QA system easier and extensible. The illustrative embodiments further provide the ability to validate core parts of the QA system, for example, verifying that the supporting passages are indeed correct given that the answer is correct.

Figure 5:
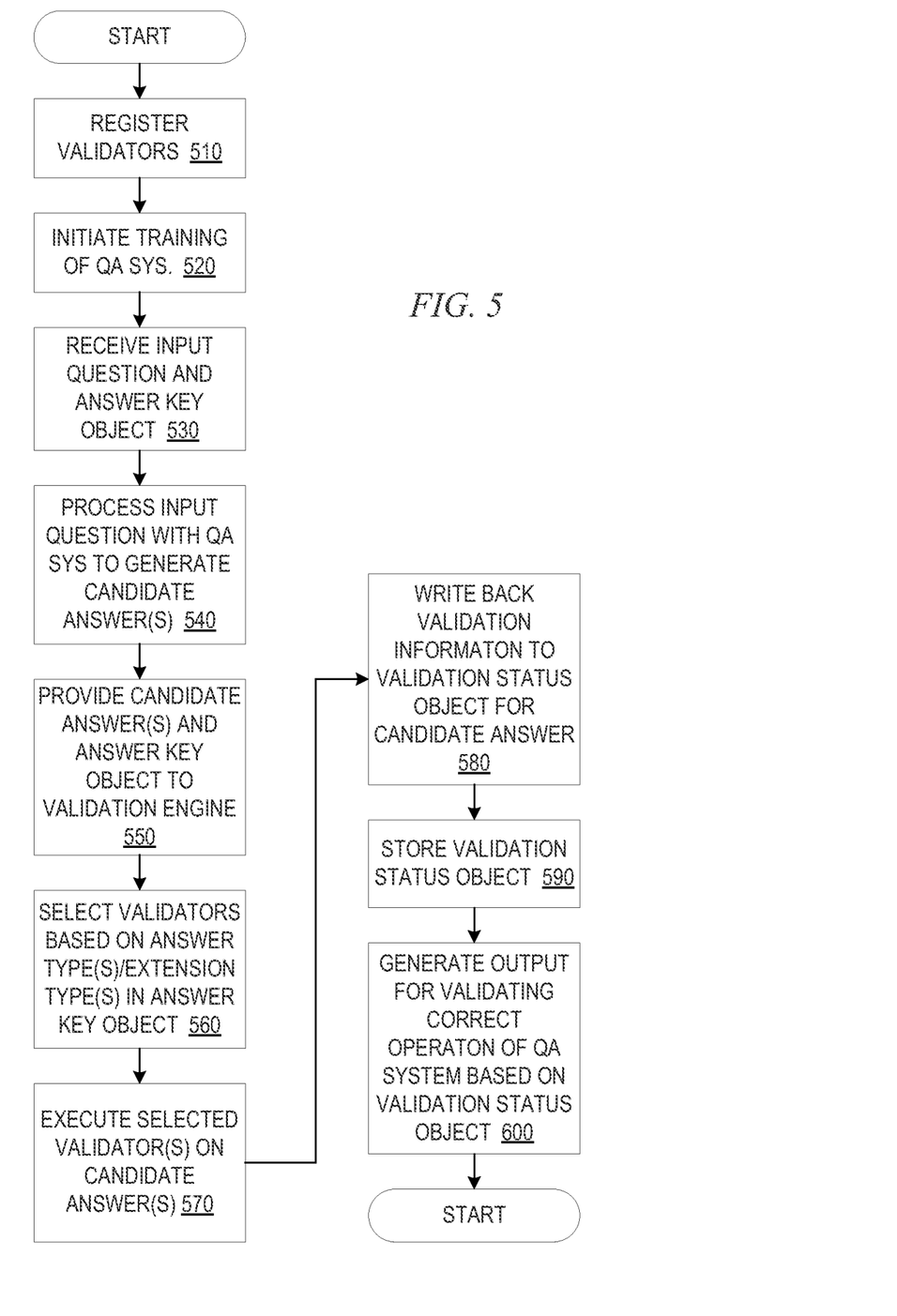
FIG. 5 is a flowchart outlining an example operation for generating validation information for a candidate answer to an input question in accordance with one illustrative embodiment.

FIG. 5 is a flowchart outlining an example operation for generating validation information for a candidate answer to an input question in accordance with one illustrative embodiment. The operation outlined in FIG. 5 may be implemented by a combination of a QA system pipeline and a validation engine, such as validation engine 390 in FIG. 3, for example, utilizing a validator registry. Thus, the operation may be implemented as software instructions executed on general purpose hardware devices, as special purpose hardware devices implementing hardware logic for performing such operations, special purpose hardware devices implementing software instructions for implementing these operations, or any combination of the above.

As shown in FIG. 5, the operation starts with the registration of one or more validators with a validator registry, which includes associating each of the validators with an associated answer type or extension type (step 510). The result is a validator registry comprising one or more validators associated with one or more answer types or extension types with which a lookup operation may be performed to determined which validators to utilize when evaluating a candidate answer.

Having generated a validator registry, training of the QA system pipeline is initiated utilizing one or more input questions and a corresponding extended answer key (step 520). An input question is received along with a corresponding answer key object for the input question (step 530). The input question is processed by the QA system pipeline to generated one or more candidate answers (step 540). Each candidate answer is generated using the generic candidate answer model with wrapper comprising the response (or answer itself), confidence information for the candidate answer, ranking information for the candidate answer, and supporting evidence passages for the candidate answer.

The candidate answers are provided to the validation engine along with an answer key object for the input question as obtained from the extended answer key (step 550). A lookup operation is performed in the validator registry based on the identified answer type(s) and extension type(s) specified in the answer type object to identify one or more validators corresponding to the answer type(s) and extension type(s) (step 560). The validators are executed on the candidate answer, the evidence passages, and/or performance information for the generation of the candidate answer to generate validation information (step 570). The validators write back the validation information to a validation status object (step 580). The validation status object is stored in association with the input question (step 590) and used to generate an output for validating correct operation of the QA system when generating the candidate answer (step 600). The operation then terminates.

Thus, the illustrative embodiments provide mechanisms for providing an extensible validation framework for improved accuracy and performance in a question and answer system. The illustrative embodiments utilize a validator registry and extended answer key for input questions to determine the validators to be executed on candidate answers and their context information, such as may be provided in a wrapper of a generic candidate answer object of a candidate answer model. A validator status object may be utilized to compile the validation information from the various validators for a particular candidate answer and used to store and/or output the validation information for validating proper operation of the QA system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for validating a candidate answer to an input question, the method comprising:
   generating, by the data processing system, a candidate answer to an input question using a natural language processing of the input question and a corpus of information from which the candidate answer is identified;
   selecting, by the data processing system, a validator to apply to the candidate answer based on a characteristic of a correct answer for the input question;
   applying, by the data processing system, the validator to the candidate answer to evaluate whether or not one or more criteria of the validator are satisfied by the candidate answer;
   generating, by the data processing system, validation information based the evaluation of whether or not criteria of the validator are met by the candidate answer; and
   storing, by the data processing system, the validation information in a validation status object associated with the input question, wherein the validator is one of a plurality of validators registered with a pluggable validator framework, and wherein registration of the validator with the pluggable validator framework comprises specifying for which answer type or answer extension type in an answer key data structure the validator corresponds to.

2. The method of claim 1, wherein selecting a validator to apply to the candidate answer based on a characteristic of the correct answer for the input question comprises:
   performing a lookup operation in an answer key data structure for an entry corresponding to a question type of the input question, wherein the entry comprises at least one of an answer type or an answer extension type, and wherein the answer type is either a literal answer type or a regular expression answer type and the answer extension type is an extended answer type other than a literal answer type or regular expression answer type; and
   selecting the validator based on a correspondence between the validator and at least one of the answer type or the answer extension type.

3. The method of claim 1, wherein the candidate answer comprises a wrapper having context information for the candidate answer, and wherein the validator operates on the context information in the wrapper of the candidate answer to determine if the one or more criteria of the validator are satisfied.

4. The method of claim 3, wherein the wrapper comprises a confidence measure metric for the candidate answer, a rank of the candidate answer, and one or more identifiers of supporting evidence passages that provide support for the candidate answer being a correct answer for the input question.

5. The method of claim 1, wherein the plurality of validators are validators selected to be applied to the candidate answer based on the answer key data structure, and wherein the validation status object stores results of applying each of the plurality of validators to the candidate answer.

6. The method of claim 5, wherein the validation status object further stores, for at least one validator of the plurality of validators, a log of operations performed by the at least one validator and corresponding results of the operations performed by the at least one validator.

7. The method of 1, wherein the validator evaluates the one or more criteria against at least one supporting evidence passage associated with the candidate answer or a performance characteristic associated with at least one stage of a question and answer pipeline implemented by the data processing system.

8. The method of 1, further comprising:
   registering each validator, in the plurality of validators, with the pluggable validator framework, wherein registration of each validator comprises mapping the validator to a corresponding answer type or answer extension type, and wherein selecting the validator comprises:
      selecting the validator from the plurality of validators registered with the pluggable validator framework based on a first lookup of one of an answer type or answer extension type corresponding to the input question in the answer key data structure;
      performing a second lookup of the answer type or answer extension type in the pluggable validator framework to identify a correlation of the validator with the answer type or answer extension type; and
      selecting the validator based on results of performing the second lookup.

9. The method of claim 1, wherein the method is implemented during a training operation for training the data processing system to answer input questions, and wherein the validation status object is processed by the data processing system to train the data processing system to answer questions similar to the input question.

10. A computer program product comprising a computer readable storage medium having a computer readable program stored therein, wherein the computer readable program, when executed on a data processing system, causes the data processing system to:
   generate a candidate answer to an input question using a natural language processing of the input question and a corpus of information from which the candidate answer is identified;
   select a validator to apply to the candidate answer based on a characteristic of a correct answer for the input question;

apply the validator to the candidate answer to evaluate whether or not one or more criteria of the validator are satisfied by the candidate answer;

generate validation information based the evaluation of whether or not criteria of the validator are met by the candidate answer; and store the validation information in a validation status object associated with the input question, wherein the validator is one of a plurality of validators registered with a pluggable validator framework, and wherein registration of the validator with the pluggable validator framework comprises specifying for which answer type or answer extension type in an answer key data structure the validator corresponds to.

11. The computer program product of claim 10, wherein the computer readable program further causes the data processing system to select a validator to apply to the candidate answer based on a characteristic of the correct answer for the input question at least by:

performing a lookup operation in an answer key data structure for an entry corresponding to a question type of the input question, wherein the entry comprises at least one of an answer type or an answer extension type, and wherein the answer type is either a literal answer type or a regular expression answer type and the answer extension type is an extended answer type other than a literal answer type or regular expression answer type; and selecting the validator based on a correspondence between the validator and at least one of the answer type or the answer extension type.

12. The computer program product of claim 10, wherein the candidate answer comprises a wrapper having context information for the candidate answer, and wherein the validator operates on the context information in the wrapper of the candidate answer to determine if the one or more criteria of the validator are satisfied.

13. The computer program product of claim 12, wherein the wrapper comprises a confidence measure metric for the candidate answer, a rank of the candidate answer, and one or more identifiers of supporting evidence passages that provide support for the candidate answer being a correct answer for the input question.

14. The computer program product of claim 10, wherein the plurality of validators are validators selected to be applied to the candidate answer based on the answer key data structure, and wherein the validation status object stores results of applying each of the plurality of validators to the candidate answer.

15. The computer program product of claim 14, wherein the validation status object further stores, for at least one validator of the plurality of validators, a log of operations performed by the at least one validator and corresponding results of the operations performed by the at least one validator.

16. The computer program product of 11, wherein the validator evaluates the one or more criteria against at least one supporting evidence passage associated with the candidate answer or a performance characteristic associated with at least one stage of a question and answer pipeline implemented by the data processing system.

17. The computer program product of 11, wherein the computer readable program further causes the data processing system to:

register each validator, in the plurality of validators, with the pluggable validator framework, wherein registration of each validator comprises mapping the validator to a corresponding answer type or answer extension type, and wherein the computer readable program further causes the data processing system to select the validator at least by:

selecting the validator from the plurality of validators registered with the pluggable validator framework based on a first lookup of one of an answer type or answer extension type corresponding to the input question in the answer key data structure;

performing a second lookup of the answer type or answer extension type in the pluggable validator framework to identify a correlation of the validator with the answer type or answer extension type; and selecting the validator based on results of performing the second lookup.

18. An apparatus comprising:

a processor; and a memory coupled to the processor, wherein the memory comprises instructions which, when executed by the processor, cause the processor to:

generate a candidate answer to an input question using a natural language processing of the input question and a corpus of information from which the candidate answer is identified;

select a validator to apply to the candidate answer based on a characteristic of a correct answer for the input question;

apply the validator to the candidate answer to evaluate whether or not one or more criteria of the validator are satisfied by the candidate answer;

generate validation information based the evaluation of whether or not criteria of the validator are met by the candidate answer; and store the validation information in a validation status object associated with the input question, wherein the validator is one of a plurality of validators registered with a pluggable validator framework, and wherein registration of the validator with the pluggable validator framework comprises specifying for which answer type or answer extension type in an answer key data structure the validator corresponds to.

* * * * *